United States Patent [19]

Rumble et al.

[11] E Patent Number: Re. 33,735

[45] Reissued Date of Patent: Nov. 5, 1991

[54] GOLF CLUB SHAFT

[75] Inventors: Joseph W. Rumble, Hartford; William G. Sprague, Litchfield, both of Conn.

[73] Assignee: Brunswick Corporation, Skokie, Ill.

[21] Appl. No.: 365,951

[22] Filed: Jun. 13, 1989

Related U.S. Patent Documents

Reissue of:

[64] Patent No.: 4,431,187
Issued: Feb. 14, 1984
Appl. No.: 391,988
Filed: Jun. 25, 1982

[51] Int. Cl.[5] ..... A63B 53/12
[52] U.S. Cl. ..... 273/80 R; 273/80 B
[58] Field of Search ..... 273/80 R, 77 R, 77 A, 273/80 B

[56] References Cited

U.S. PATENT DOCUMENTS

| | | | |
|---|---|---|---|
| 1,670,530 | 5/1928 | Cowdery | 273/80 B |
| 1,670,531 | 5/1928 | Cowdery | 273/80 B |
| 1,765,709 | 6/1930 | Withington | 273/80 B |
| 1,974,389 | 9/1934 | Cowdery | 273/80 B |
| 1,983,074 | 12/1934 | Durell | 273/80 B |
| 1,994,069 | 3/1935 | Fletcher | 273/80 B |
| 3,871,649 | 3/1975 | Kilshaw | 273/77 A |
| 4,165,874 | 8/1974 | Lezatte et al. | 273/80 B X |
| 4,169,595 | 10/1979 | Kaugars | 273/80 R |

FOREIGN PATENT DOCUMENTS

| | | | |
|---|---|---|---|
| WO/8100520 | 3/1981 | European Pat. Off. | 273/80 B |
| WO/8100521 | 3/1981 | European Pat. Off. | 273/80 B |
| 389353 | 3/1933 | United Kingdom | 273/80 R |
| 482164 | 1/1938 | United Kingdom | 273/80 B |
| 1262896 | 2/1972 | United Kingdom | 273/77 A X |
| 2071504 | 9/1981 | United Kingdom | 273/80 R |

*Primary Examiner*—Edward M. Coven
*Assistant Examiner*—Sebastiano Passaniti
*Attorney, Agent, or Firm*—Sughrue, Mion, Zinn, Macpeak & Seas

[57] ABSTRACT

A shaft for a golf club includes a first series of step portions, with the step portions increasing in diameter along the shaft from a tip or hosel end of the shaft toward a grip end. The step portions are separated from adjacent step portions by transitional portions which consist of a relatively gentle taper which smoothly link the surfaces of one step portion with another. A second series of step portions is disposed between the first series of step portions and the grip end of the shaft, with the diameter of the step portions increasing by a predetermined amount from the first series of step portions toward the grip end. The second series of step portions are separated from adjacent step portions and from the grip end further transitional portions which are similar to the transitional portions discussed above. The golf shaft of the present invention has reduced stress concentration points along the circumferential axis of the shaft, a smoother line of dynamic deflection and a unique finished product appearance.

17 Claims, 2 Drawing Sheets

GOLF CLUB SHAFT

Matter enclosed in heavy brackets [ ] appears in the original patent but forms no part of this reissue specification; matter printed in italics indicates the additions made by reissue.

DESCRIPTION

BACKGROUND OF THE INVENTION

This invention relates generally to golf club apparatus, and more particularly to a shaft for a golf club which is lightweight but can provide the necessary stiffness characteristics demanded by golfers.

Ideally, a golf shaft should be designed such that the outer diameter thereof is smoothly tapered by reducing the diameter from a grip end to a tip or hosel end by means of a swaging operation. This swaging would achieve the reduced diametrical dimensions along the circumferential axis of the shaft without introducing abrupt diameter reductions while at the same time maintaining a gradual wall thickness increase from the grip end to the tip. It has been found, however, that the manufacturing expense of such a golf shaft processed by the above noted swaging method is prohibitive and that the final appearance of the golf shaft is less pleasing than other types of configurations.

Moreover, it is generally known that an ideal golf shaft should be of negligible weight while at the same time providing sufficient stiffness characteristics to allow effectively all of the kinetic energy developed by the golfer to be transmitted to the golf ball with a high degree of control over the resulting shot. However, in practice, it is not possible to manufacture an effective club shaft having negligible weight; therefore, the design of conventional club shafts varies substantially from the ideal.

Conventional present day golf shafts typically achieve the reduction in diameter from the grip end to the tip by means of a series of step portions disposed along the length of the shaft, with the diameters of the step portions becoming progressively smaller toward the tip end. Adjacent step portions are separated by narrow transitional portions which comprise an abrupt reduction of diameter from one step to an adjacent step. It has been found, however, that the use of these abrupt transitional portions results in undesirable characteristics for the golf shaft. These undesirable characteristics include: (a) the establishment of stress concentration points along the circumferential axis of the shaft at the abrupt transitional portions; (b) the assumption of a relatively disjointed line of dynamic deflection of the shaft during swinging of the club; and (c) the club shaft must be of relatively heavy weight to overcome the disadvantages (a)–(b) noted above.

One successful attempt at reducing the weight of a golf shaft is shown and described in Kaugars U.S. Pat. No. 4,169,595, assigned to the assignee of the instant application. The club shaft disclosed in that patent utilizes a series of steps of varying lengths disposed along the length of the shaft wherein the particular configuration of steps results in a stronger shaft. This increase in strength permits the average wall thickness of the shaft to be reduced, in turn leading to a reduction of weight with the attendant advantages noted above.

SUMMARY OF THE INVENTION

In accordance with the present invention a golf club shaft is configured so as to include a plurality of constant diameter steps separated by transitional portions which are designed so as to result in a club shaft which is light in weight yet has the desirable characteristic deemed necessary by golfers.

The golf club shaft includes a first series of alternating steps and frustoconical transitional portions, with each of the transitional portions having a first length and each of the steps having a second length. Disposed adjacent to this first series is a second series of alternating steps and frustoconical transitional portions, with each of the steps having a third length and each of the transitional portions having a length equal to the first length. Each of the transitional portions forms a relatively gentle taper which smoothly links adjacent step portions, thereby avoiding the abrupt transitions found in the prior art. It has been found that this configuration results in a reduction of stress concentration points along the circumferential axis of the shaft, as well as smoothing out the line of dynamic deflection. The above noted configuration also results in a unique finished product appearance which is pleasing to the eye.

DETAILED DESCRIPTION OF THE INVENTION

Figure 1:
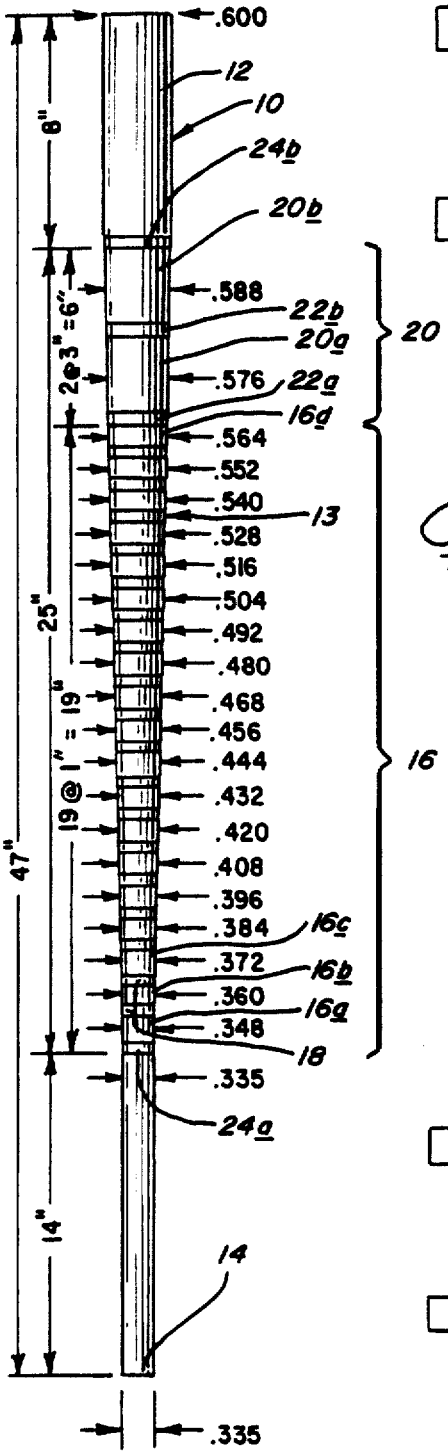
FIG. 1 is an elevational view of a golf club shaft according to the present invention.

Referring now to FIG. 1, there is illustrated a golf shaft 10 according to the present invention. The shaft 10 includes a grip end 12 which is received within a hand grip (not shown), and a tip or hosel end 14 to which a club head (not shown) is secured. A main shaft portion 13 is disposed between the grip end 12 and the hosel end 14. It should be noted that the hosel end 14 may be tapered or may have a parallel tip such as that shown in the figures to accommodate different types of club heads, as required. The club shaft shown in FIG. 1 is intended for use as a shaft for the woods of a golf club set, but it is understood that the shaft can be used on irons, putters and other types of shafts.

The main shaft portion 13 includes a first series or set of equally spaced step portions 16, some of which are shown as 16a,16b,16c, disposed along the length of the shaft adjacent the tip end 14, with adjacent step portions being separated by frustoconical transitional portions 18.

In the preferred embodiment, each step portion is cylindrical in shape, i.e., has a constant diameter along its length, and the diameter of each step portion 16 varies by a predetermined amount from the diameter of adjacent step portions. In the preferred embodiment, the diameter of the step portion 16a is less than the diameter of the step portion 16b by 0.012" and the diameter of the step portion 16c is greater than the diameter of the step portion 16b by this same amount. It should be noted that this predetermined amount may be varied to suit.

Moreover, in the preferred embodiment the lengths of the step portion 16 are equal and are on the order of ¾". However, the step portions 16 may have different lengths, if desired.

Each of the transitional portions 18 comprises a taper which smoothly links the varying diameters of adjacent step portions 16. In the preferred embodiment, the length of each transitional portion 18 parallel to the axis of the shaft is on the order of ½". Moreover, the length of each transitional portion is substantially greater than the difference between the diameters of the adjacent step portions.

In one preferred embodiment, there are 19 step portions 16 and transitional portions 18, with the combined length of a step portion and an adjacent transitional portion being on the order of 1". The step portion 16a adjacent the hosel end 14 has a diameter of 0.348" while the diameter of the step portion 16d, i.e. the last step portion in the first series, has a diameter of 0.564", with the diameter of intermediate step portions differing from the diameter of adjacent step portions by 0.012" as previously noted.

Disposed adjacent to the first series of step portions 16 is a second series of equally spaced step portions 20 consisting of a step portion 20a and a step portion 20b. In one preferred embodiment, the diameter of the step portion 20a is larger than the diameter of the adjacent step portion 16d by 0.012". Similarly, the diameter of the step portion 20b is larger than the diameter of step portion 20a by this same amount.

The lengths of the step portions 20a, 20b are equal and in the one preferred embodiment are on the order of 2¾".

The second series of step portions 20 are separated by frustoconical transitional portions 22, which in the preferred embodiment comprise tapered portions 22a, 22b. The transitional portions 22a, 22b in the one preferred embodiment have the same length parallel to the axis of the shaft as the transitional portions 18 noted above, i.e., on the order of ½".

There are two further frustoconical transitional portions 24a, 24b between the series of step portions 16, 18 and the hosel end 14 and the grip end 12, respectively. The transitional portion 24B is disposed between the step portion 20B and the grip end 12 and comprises a tapered portion ¼" in length which smoothly joins the 0.012" diametrical transition between the two portions 20b, 12.

Similarly, the transitional portion 24a comprises a tapered portion which is ¼" in length and provides a smooth transition between the 0.348" diameter of the step portion 16a and the 0.335" diameter of the hosel end 14.

In the one preferred embodiment, the shaft is manufactured of S.A.E. 5046 modified alloy steel and has the dimensions noted below:

| Dimensions | |
|---|---|
| Length of grip end 12 + transitional portion 24b | 8" |
| Length of first series of step portions 16 + transitional portions 18 + transitional portion 24a | 19" |
| Length of second series of step portions 20 + transitional portions 22 | 6" |
| Length of hosel end 14 | 14" |
| Overall length of shaft | 47" |

Figure 3A:
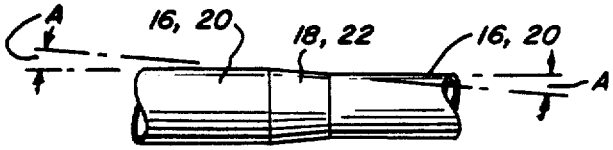
FIGS. 3A and 3B are enlarged partial elevational views of the shafts shown in FIGS. 2A and 2B, respectively, showing the transitional portions thereof.

Referring also to FIG. 3A, since each of the transitional portions, 18, 22 and 24b are of the same length and link adjacent step portions having diameters which differ by a constant amount, it follows that all of the transitional portions form equal taper angles, designated A in FIG. 3, with respect to the adjacent step portions. In the preferred embodiment, the taper angle A is equal to:

$$\text{ArcTan}\,\frac{0.006}{0.25} - \text{approximately } 1.5^\circ$$

Figure 2A:
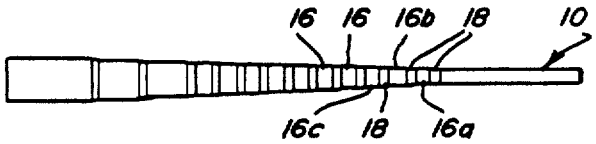
FIGS. 2A and 2B are elevational view showing the distinction between the golf club shaft of the present invention and a conventional shaft, respectively.
Figure 2B:
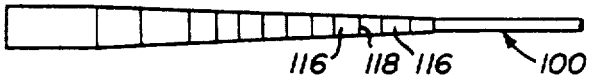
FIG. 2B PRIOR ART
Figure 3B:
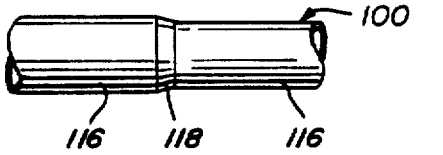
FIG. 3B PRIOR ART

In the conventional shaft 100 shown in FIGS. 2B and 3B, non-tapered step portions 116 are separated by abrupt transitional portions 118 which in some cases can lie perpendicular to the step portions 116 and in other cases have a length of very limited extent.

It should be noted that the angle A of each transitional portion primarily determines the increase of strength of the shaft 10 over conventional shafts regardless of the lengths or diametrical difference of adjacent step portions. In fact, it would be desirable to manufacture a shaft having a taper angle less than approximately 1.5° and having shorter and/or fewer step portions so as to more closely approximate the ideal; however, it is presently not economically feasible to manufacture shafts having a taper angle less than the angle A.

In any event, regardless of the difference between the diameters of adjacent step portions and the lengths thereof, it is desirable to maintain the taper angle A as close to approximately 1.5° as possible, if not less than this amount to achieve the best results.

The shaft 10 shown in FIG. 1 has a weight of 4.20 ounces before trimming for assembly. The shaft 10 may be trimmed for assembly by removing 2" from the grip end 12 for a gear flex shaft, or by removing 2" from the tip end 14 for a stiff flex shaft. The resulting weight of the shaft after trimming is 4.00 ounces.

As seen in FIGS. 2A, 2B, 3A and 3B, the alternating series of step and tapered portions results in a unique appearance of the shaft 10 of the present invention as opposed to conventional shafts, such as shown in FIG. 2B. Moreover, the use of the transitional portions 18, 22 results in improved characteristics for the shaft, as opposed to the use of abrupt transitions between adjacent step portions of a conventional shaft, such as shown in FIG. 3B.

Figure 4A:
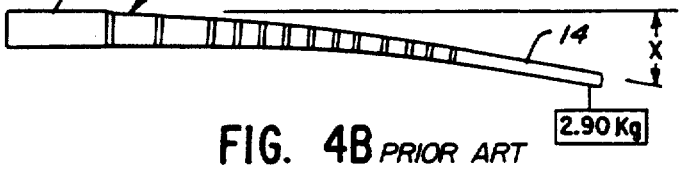
FIGS. 4A and 4B are schematic elevational views of the shafts shown in FIGS. 2A and 2B, respectively, showing the deflection of the shafts in response to an applied weight.
Figure 4B:
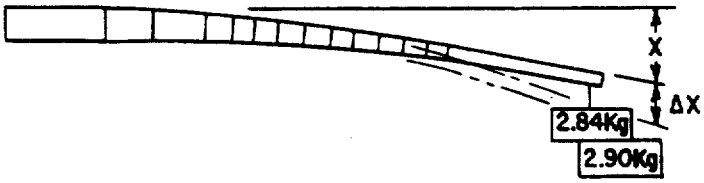
FIG. 4B PRIOR ART

For example, as shown in FIGS. 4A and 4B, there is illustrated a graphical representation of a test for determining the relative stiffness of a shaft 10 according to the present invention, shown in FIG. 4A, and a conventional shaft shown in FIG. 4B. In the test illustrated in FIGS. 4A and 4B, the shafts were constructed from identical shaft blanks having an outer diameter of 0.600", a weight of 4.00 ounces and identical step patterns. In each case, the shafts shown in FIGS. 4A and 4B were supported at their grip end and weights were applied at equal distances from the tip of the hosel end so as to determine the stiffness of the shafts. As shown in FIG. 4A, a weight of 2.90 kilograms caused the tip of the hosel end 14 to deflect by a distance X. On the other hand, a weight of 2.84 kilograms attached to the hosel end of the standard shaft shown in FIG. 4B caused an equal deflection by an amount X. In fact, securing a weight of 2.90 kilograms to the hosel end of the conventional shaft shown in FIG. 4B caused the shaft tip to deflect by an amount equal to $X+\Delta X$. Clearly then, the shaft 10 of the present invention as shown in FIG. 4A is stiffer than the conventional shaft shown in FIG. 4B even though the shafts are of the same diameter and are of equal weights.

Moreover, tests have been performed comparing the deflection characteristics of the golf shaft of the present invention with a heavier conventional or standard shaft.

The results of the test were as follows:

| Shaft | Average Weight | Grip End Diameter | Tip End Diameter | Deflection at X in. from grip end X = 15½" | X = 28¼" | X = 40½" |
|---|---|---|---|---|---|---|
| Improved Shaft | 4.00 oz. | 0.600 | 0.335 | 12½ mm | 59 mm | 143 mm |
| Std. Shaft | 4.30 oz. | 0.600 | 0.335 | 12½ mm | 60¼ mm | 141 mm |

As seen by the results of this test, the deflection characteristics are approximately the same for the golf shaft of the present invention and a standard shaft of heavier weight. One might expect that, due to the lighter weight of the shaft of the present invention, the shaft would deflect significantly more in response to an applied weight than the regular shaft of heavier weight to which this same deflective force is applied. However, the stiffer sectional deflection characteristics of the shaft of the present invention results in the shaft having the same approximate deflection characteristics as standard shafts, even though the shaft of the present invention weighs approximately 0.30 ounces less.

Another test was made comparing the deflection characteristics of the shaft of the present invention with a light weight shaft, such as that shown in U.S. Pat. No. 4,169,595. In this test, the lightweight shaft and the present shaft have the same weight, however, the diameter at the grip end of the lightweight shaft was greater than that of the shaft of the present invention. The results of the test are as follows:

| Shaft | Average Weight | Grip End Diameter | Tip End Diameter | Deflection at X ins. From Grip End X = 15½" | X = 28¼" | X = 40½" |
|---|---|---|---|---|---|---|
| Improved Shaft | 4.00 oz. | 0.600 | 0.335 | 12½ mm | 59 mm | 143 mm |
| Light-weight Shaft | 4.00 oz | 0.620 | 0.335 | 13 mm | 64 mm | 152 mm |

One might expect the larger diameter lightweight shaft to deflect less than the shaft of the present invention due to the stiffness introduced by the increase in grip end diameter, however, the stiffer sectional deflection of the shaft of the present invention results in less deflection thereof.

Further tests have been performed comparing the characteristics of the shaft of the present invention with conventional shafts. In a first test, the two types of shafts were tested on an Instron testing machine to test the bending strength and deflection resistance of the two types of shafts. In each case, the test location was selected to be the first portion from the hosel end with a lever arm of 2". The shafts were subjected to bending forces in the vicinity of the test location until failure of the material resulted. In each case, the outer diameter of the test location was equal to 0.348" with a wall thickness of 0.017 inches. Also, in both cases, section modulus were equal to 0.0013948. It was found that the yield strength and the ultimate strength were equal as follows:

Improved Shaft Yield Strength=130 lb =360 in-lb=258,000 PSI

Conventional Shaft Yield Strength=180 lb=360 in-lb=258,000 PSI

Figure 5:
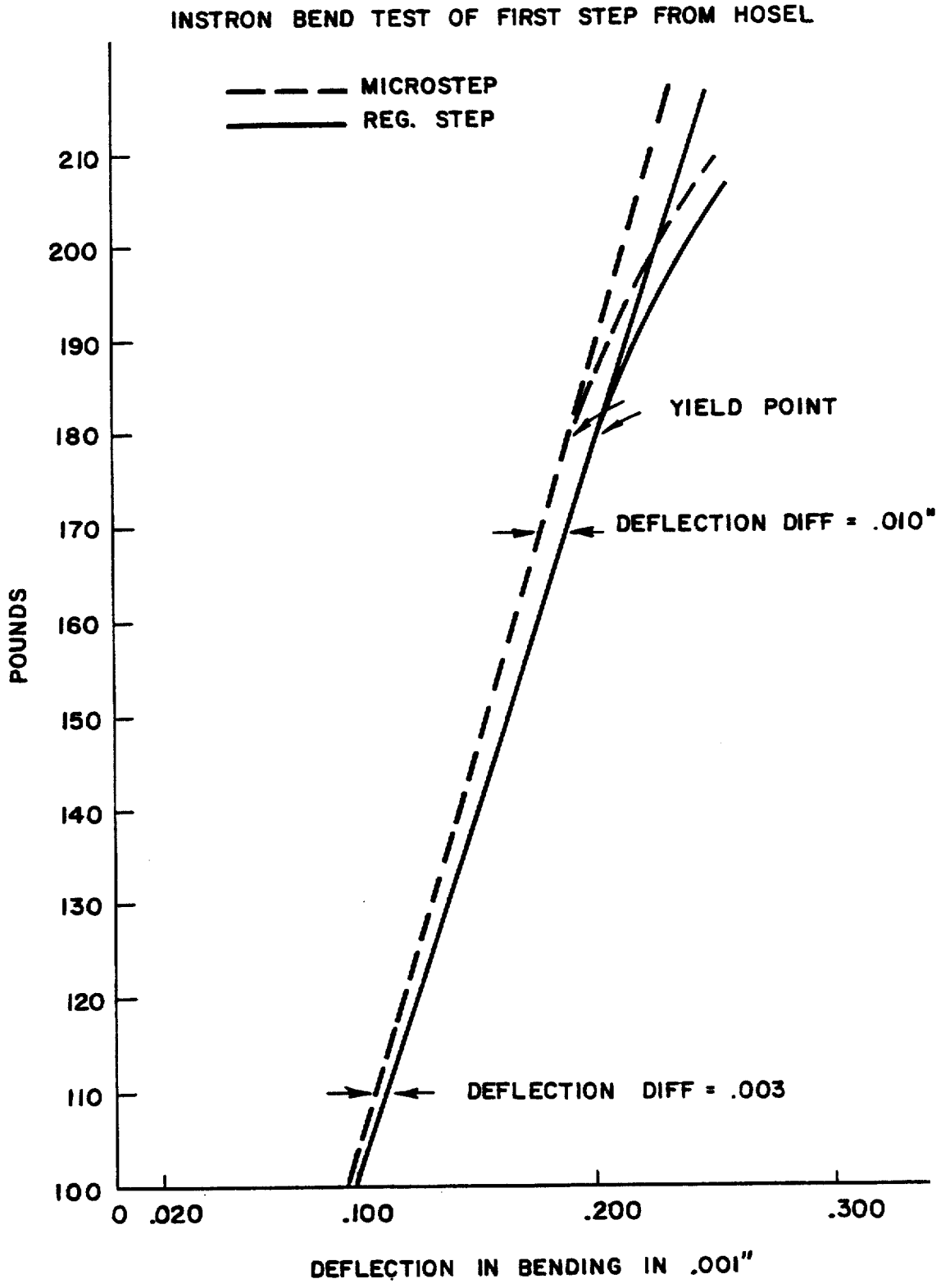
FIG. 5 is a graph showing the difference in the degree of deflection of the typical shaft step shown in FIGS. 4A and 4B in response to the application of varying weights thereto.

Even though the bending strength of the two samples were identical, the deflection resistance of the shaft of the present invention was found to be higher than the deflection resistance of the conventional shaft. As seen in FIG. 5, the difference in deflection resistance between the two types of shafts increased with increasing loading of the shafts, with the difference in deflection at 110 lbs of applied load being approximately equal to 0.003 and the difference at 170 lbs of applied load being equal to 0.010".

Two samples each of the shaft of the present invention and of a conventional shaft were tested to determine the breakage resistance thereof. In this case, the shafts were assembled into identical club heads and were swung in an arc, similar to a golfer's swing, against a simulated ball mounted on a track which moves with the impact of the club head. These strokes were repeated until shaft breakage occurred. The speed of the stroke and the impact forces of the shaft hitting the ball were held equal through the testing of all shifts. The results of the tests were as follows:

| | Strokes Before Shaft Breakage Improved Shaft | Conventional Shaft |
|---|---|---|
| Sample #1 | 2,855 | 976 |
| Sample #2 | 4,818 | 703 |

It can be seen that the shaft of the present invention experienced approximately three times of number of strokes before breaking than did the conventional shaft. The test performed on the second samples of shafts shows that the shaft of the present invention withstood nearly seven times of the number of strokes before breaking than did the conventional shaft. It is felt that this increased resistance to breakage is a result of the reduction in stress concentration points along the length of the shaft due to all absence of abrupt diametrical changes between step portions.

Finally, a test was performed on two samples of each type of club, i.e., the shaft of the present invention and a conventional shaft, to determine the fatigue resistance thereof. This test was performed by rotating the shafts at a constant speed while at the same time applying a severe bending force along the shaft axis. This cycle was repeated until failure of the material and shaft breakage occurred. In this type of test all breakage occurs at the transition between steps. The result of this test were as follows:

| | Cycles Before Breakage | |
|---|---|---|
| | Improved Shaft | Conventional Shaft |
| Sample #1 | 46 | 14 |
| Sample #2 | 40 | 8 |

Again, it can be seen that fatigue resistance is improved in the shaft of the present invention, it being capable of being cycled approximately 3-5 times the number to which the conventional shaft can be subjected. This improvement in fatigue resistance is felt to be a direct result of the elimination of the abrupt transitional changes in diameter between step portions.

We claim:

1. A golf club shaft having a grip end, a hosel end and a main shaft portion intermediate the grip and hosel ends, the main shaft portion having a plurality of [stop] *step* portions with each adjacent pair of step portions having a transitional portion therebetween, the main shaft portion comprising:

a first step portion extending partly along a length of the main shaft portion and having a first diameter;

a second step portion extending partly along the length of the main shaft portion and spaced from the first step portion and having a second diameter different than the first diameter; and a transitional portion disposed between the first and second step portions having a tapered outer surface of changing diameter smoothly linking the first and second step portions, *the tapered outer surface being characterized by a taper angle of approximately 1.5°*, the length of the transitional portion being substantially greater than the difference between the first and second diameters wherein the pattern of the step portions and transitional portions of the main shaft portion is substantially as shown in FIG. 1.

2. A golf club shaft having a grip end, a hosel end and a main shaft portion intermediate the grip and hosel ends, *the main shaft portion* comprising:

a first series of equally spaced step portions disposed adjacent the hosel end [on the main shaft portion], each step portion of the first series having a first length;

a second series of equally spaced step portions disposed [on the main shaft portion] between the first series and the grip end and spaced therefrom, each step portion of the second series having a second length different than the first length, the diameters of the first and second series of step portions decreasing by a constant amount from the grip end to the hosel end; and a plurality of tapered transitional portions wherein a transitional portion is disposed between adjacent step portions for smoothly linking the surfaces of the adjacent step portions, *the tapered transitional portions being characterized by a taper angle of approximately 1.5°*, the length of each transitional portion being substantially greater than the difference between the diameters of the respective adjacent step portions, wherein the pattern of the step portions and the transitional portions is substantially as shown in FIG. 1.

3. The golf club shaft of claim 2, wherein the transitional portions are tapered to provide a frustoconical surface joined between adjacent step portions.

4. The golf club shaft of claim 2, wherein the step portions are each cylindrical in shape.

5. The golf club shaft of claim 2, wherein further transitional portions are disposed between the second series of step portions and the grip end and between the first series of step portions and the hosel end.

6. The golf club shaft of claim 2, wherein each transitional portion includes a frustoconical surface, all of the frustoconical surfaces having an equal length.

7. The golf club shaft of claim 6, wherein all of the frustoconical surfaces form equal angles with respect to the adjacent step portions.

8. The golf club shaft of claim 6, wherein the length of each frustoconical surface is on the order of ¼ inch.

9. The golf club shaft of claim 2, wherein the diameter of each of the step portions from the grip end toward the hosel end is less than the diameter of the adjacent step portion toward the grip end of the order of 0.012 inch.

10. The golf club shaft of claim 2, wherein there are nineteen step portions in the first series of step portions and each such step portion is ¾ inch long.

11. The golf club shaft of claim 2, wherein there are two step portions in the second series of step portions and each such step portion is on the order of 2¾ inch long.

12. A golf club shaft having a grip end, a hosel end and a main shaft portion intermediate the grip and hosel ends, *the main shaft portion* comprising:

a first series of equally spaced cylindrical step portions disposed adjacent the hosel end on the main shaft portion, each step portion of the first series having a first length and having a diameter which differs from the diameter of adjacent step portions by a predetermined amount;

a second series of equally spaced cylindrical step portions disposed on the main shaft portion between the first series and the grip end and spaced therefrom, each step portion of the second series having a second length greater than the first length and having a diameter which differs from the diameter of adjacent step portions by the predetermined amount; and a plurality of transitional portions wherein each transitional portion includes a frustoconical surface disposed between and smoothly linking adjacent step portions, all of the frustoconical surfaces *in said first and second series* being of equal length and forming equal angles *of approximately 1.5°* with respect to adjacent step portions, the length of each transitional portion being substantially greater than the predetermined amount.

13. The golf club shaft of claim 12, wherein the length of each frustoconical surface is on the order of ¼ inch.

14. The golf club shaft of claim 13, wherein the predetermined amount is on the order of 0.012 inch.

15. The golf club shaft of claim 14, wherein the length of each step portion of the first series of on the order of $\frac{3}{4}''$.

16. The golf club shaft of claim 15, wherein the length of each step portion of the second series is on the order of $2\frac{3}{4}''$.

*17. The golf club shaft of claim 12, wherein further transitional portions are disposed between the second series of step portions and the grip end and between the first series of step portions and the hosel end.*

* * * * *